(12) United States Patent
Sharma et al.

(10) Patent No.: US 8,959,642 B2
(45) Date of Patent: *Feb. 17, 2015

(54) REAL TIME LOCKDOWN

(71) Applicant: Websense, Inc., San Diego, CA (US)

(72) Inventors: Rajesh Kumar Sharma, San Diego, CA (US); Winping Lo, San Diego, CA (US); Joseph Papa, Carlsbad, CA (US)

(73) Assignee: Websense, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/900,954

(22) Filed: May 23, 2013

(65) Prior Publication Data

US 2013/0254839 A1 Sep. 26, 2013

Related U.S. Application Data

(63) Continuation of application No. 11/319,678, filed on Dec. 28, 2005, now Pat. No. 8,453,243.

(51) Int. Cl.
*G06F 21/00* (2013.01)
*G06F 21/60* (2013.01)
(Continued)

(52) U.S. Cl.
CPC .............. *G06F 21/60* (2013.01); *G06F 21/554* (2013.01); *G06F 21/56* (2013.01)
USPC ........ 726/24; 726/1; 726/4; 726/22; 713/150; 713/156; 713/176

(58) Field of Classification Search
CPC ...................................................... G06F 21/60
USPC ............... 726/1, 4, 22, 24; 713/150, 156, 176
See application file for complete search history.

(56) References Cited

U.S. PATENT DOCUMENTS 5,408,642 A 4/1995 Mann
5,549,610 A 8/1996 Russell et al.
(Continued)

FOREIGN PATENT DOCUMENTS

EP 1130495 9/2001
EP 1280040 A2 1/2003
(Continued)

OTHER PUBLICATIONS

"A look in the mirror: Attacks on package managers"; Cappos et al; Proceedings of the 15th ACM conference; 10 pages, ACM 2008.*
(Continued)

*Primary Examiner* — Jason Lee
(74) *Attorney, Agent, or Firm* — Knobbe Martens Olson & Bear LLP

(57) ABSTRACT

A system and method that trusts software executables existent on a machine prior to activation for different types of accesses e.g. execution, network, and registry. The system detects new executables added to the machine as well as previously existent executables that have been modified, moved, renamed or deleted. In certain embodiments, the system will tag the file with a flag as modified or newly added. Once tagged, the system intercepts particular types of file accesses for execution, network or registry. The system determines if the file performing the access is flagged and may apply one or more policies based on the requested access. In certain embodiments, the system intercepts I/O operations by file systems or file system volumes and flags metadata associated with the file. For example, the NT File System and its extended attributes and alternate streams may be utilized to implement the system.

16 Claims, 6 Drawing Sheets

(51) Int. Cl.
*G06F 21/55* (2013.01)
*G06F 21/56* (2013.01)

(56) References Cited

U.S. PATENT DOCUMENTS

| | | |
|---|---|---|
| 5,643,086 A | 7/1997 | Alcorn et al. |
| 5,899,991 A | 5/1999 | Karch |
| 5,919,257 A | 7/1999 | Trostle |
| 5,936,830 A | 8/1999 | Rousseau et al. |
| 5,944,821 A | 8/1999 | Angelo |
| 5,987,611 A | 11/1999 | Freund |
| 5,999,740 A | 12/1999 | Rowley |
| 6,073,239 A | 6/2000 | Dotan |
| 6,092,194 A | 7/2000 | Touboul |
| 6,167,358 A | 12/2000 | Othmer et al. |
| 6,167,538 A | 12/2000 | Neufeld et al. |
| 6,233,618 B1 | 5/2001 | Shannon |
| 6,324,578 B1 | 11/2001 | Cox et al. |
| 6,560,632 B1 | 5/2003 | Chess et al. |
| 6,564,327 B1 | 5/2003 | Klensin et al. |
| 6,606,659 B1 | 8/2003 | Hegli et al. |
| 6,772,214 B1 | 8/2004 | McClain et al. |
| 6,772,346 B1 | 8/2004 | Chess et al. |
| 6,804,780 B1 | 10/2004 | Touboul |
| 6,832,230 B1 | 12/2004 | Zilliacus et al. |
| 6,944,772 B2 | 9/2005 | Dozortsev |
| 6,988,209 B1 | 1/2006 | Balasubramaniam et al. |
| 7,058,822 B2 | 6/2006 | Edery et al. |
| 7,080,000 B1 | 7/2006 | Cambridge |
| 7,089,246 B1 | 8/2006 | O'laughlen |
| 7,185,015 B2 | 2/2007 | Kester et al. |
| 7,185,361 B1 | 2/2007 | Ashoff et al. |
| 7,194,464 B2 | 3/2007 | Kester et al. |
| 7,210,041 B1 | 4/2007 | Gryaznov et al. |
| 7,280,529 B1 | 10/2007 | Black et al. |
| 7,299,277 B1 | 11/2007 | Moran et al. |
| 7,415,439 B2 | 8/2008 | Kontio et al. |
| 7,418,733 B2 | 8/2008 | Connary et al. |
| 7,496,960 B1 | 2/2009 | Chen et al. |
| 7,529,254 B2 | 5/2009 | Tsuge et al. |
| 7,797,270 B2 | 9/2010 | Kester et al. |
| 8,010,469 B2 | 8/2011 | Kapoor et al. |
| 2001/0047474 A1 | 11/2001 | Takagi |
| 2002/0049883 A1 | 4/2002 | Schneider et al. |
| 2002/0078045 A1 | 6/2002 | Dutta |
| 2002/0099952 A1 | 7/2002 | Lambert et al. |
| 2002/0129277 A1 | 9/2002 | Caccavale |
| 2002/0133509 A1 | 9/2002 | Johnston et al. |
| 2002/0144129 A1 | 10/2002 | Malivanchuk et al. |
| 2002/0174010 A1 | 11/2002 | Rice, III |
| 2002/0178374 A1 | 11/2002 | Swimmer et al. |
| 2002/0194194 A1 | 12/2002 | Fenton et al. |
| 2003/0023860 A1 | 1/2003 | Eatough et al. |
| 2003/0033525 A1 | 2/2003 | Rajaram |
| 2003/0051027 A1 | 3/2003 | Aupperle et al. |
| 2003/0074567 A1 | 4/2003 | Charbonneau |
| 2003/0088545 A1 | 5/2003 | Subramaniam et al. |
| 2003/0088680 A1 | 5/2003 | Nachenberg et al. |
| 2003/0147369 A1 | 8/2003 | Singh et al. |
| 2003/0154399 A1 | 8/2003 | Zuk et al. |
| 2003/0177187 A1 | 9/2003 | Levine et al. |
| 2003/0229779 A1 | 12/2003 | Morais et al. |
| 2003/0236894 A1 | 12/2003 | Herley |
| 2004/0044912 A1 | 3/2004 | Connary et al. |
| 2004/0078591 A1 | 4/2004 | Teixeira et al. |
| 2004/0093167 A1 | 5/2004 | Braig et al. |
| 2004/0111499 A1 | 6/2004 | Dobrowski et al. |
| 2004/0117624 A1 | 6/2004 | Brandt et al. |
| 2004/0139309 A1 | 7/2004 | Gentil et al. |
| 2004/0153644 A1 | 8/2004 | McCorkendale |
| 2004/0153666 A1 | 8/2004 | Sobel |
| 2004/0162876 A1 | 8/2004 | Kohavi |
| 2004/0181788 A1 | 9/2004 | Kester et al. |
| 2004/0187029 A1 | 9/2004 | Ting |
| 2004/0193652 A1 | 9/2004 | Wendker et al. |
| 2004/0254809 A1 | 12/2004 | Teicher |
| 2005/0004875 A1 | 1/2005 | Kontio et al. |
| 2005/0055519 A1 | 3/2005 | Stuart et al. |
| 2005/0091535 A1 | 4/2005 | Kavalam et al. |
| 2005/0131868 A1 | 6/2005 | Lin et al. |
| 2005/0132184 A1 | 6/2005 | Palliyil et al. |
| 2005/0149759 A1 | 7/2005 | Vishwanath et al. |
| 2005/0155012 A1 | 7/2005 | Tayama et al. |
| 2005/0210035 A1 | 9/2005 | Kester et al. |
| 2005/0223001 A1 | 10/2005 | Kester et al. |
| 2005/0251862 A1 | 11/2005 | Talvitie |
| 2005/0273858 A1 | 12/2005 | Zadok et al. |
| 2006/0004636 A1 | 1/2006 | Kester et al. |
| 2006/0026105 A1 | 2/2006 | Endoh |
| 2006/0031504 A1 | 2/2006 | Hegli et al. |
| 2006/0064596 A1 | 3/2006 | Feinleib et al. |
| 2006/0080735 A1 | 4/2006 | Brinson et al. |
| 2006/0095586 A1 | 5/2006 | Adelman et al. |
| 2006/0095965 A1 | 5/2006 | Phillips et al. |
| 2006/0191008 A1 | 8/2006 | Fernando et al. |
| 2006/0259948 A1 | 11/2006 | Calow et al. |
| 2006/0265750 A1 | 11/2006 | Huddleston |
| 2007/0005762 A1 | 1/2007 | Knox et al. |
| 2007/0028302 A1 | 2/2007 | Brennan et al. |
| 2007/0053513 A1 | 3/2007 | Hoffberg |
| 2007/0111799 A1 | 5/2007 | Robb et al. |
| 2007/0180477 A1 | 8/2007 | Hutcheson |
| 2007/0204223 A1 | 8/2007 | Bartels et al. |
| 2008/0046281 A1 | 2/2008 | Teicher |
| 2008/0046282 A1 | 2/2008 | Teicher |
| 2008/0201415 A1 | 8/2008 | Herley |
| 2008/0214300 A1 | 9/2008 | Williams et al. |
| 2008/0267144 A1 | 10/2008 | Jano et al. |
| 2008/0295177 A1 | 11/2008 | Dettinger et al. |
| 2009/0216641 A1 | 8/2009 | Hubbard |
| 2009/0216729 A1 | 8/2009 | Kester et al. |

FOREIGN PATENT DOCUMENTS

| | | |
|---|---|---|
| EP | 1457885 | 9/2004 |
| EP | 1638016 | 3/2006 |
| WO | WO 96/05549 A1 | 2/1996 |
| WO | WO 01/24012 | 4/2001 |
| WO | WO 2005/099340 | 10/2005 |

OTHER PUBLICATIONS

Ang, P. H. et al., "Censorship and the Internet: A Singapore Perspective", Communications of the Association for computing machinery, Jun. 1, 1996, vol. 39, Issue 6, pp. 72-78, New York, NY.

Cohen F: A Cryptographic Checksum for Integrity Protection Computers & Security, Elsevier Science Publishers, Amsterdam, NL, vol. 6 No. 6,Dec. 1, 1987, I pp. 505-510, XP000048122 ISSN: 0167-4048 Chapter 4. Including File Data in the Checksum.

Dahan, M. Ed., "The Internet and government censorship: the case of the Israeli secretservice" Online information., Proceedings of the International Online Information Meeting, Oxford, Learned Information, GB, Dec. 12-14, 1989, vol. Meeting 13, December, Issue XP000601363, pp. 41-48, Sections 1,3., London.

Forte, M. et al., "A content classification and filtering server for the Internet", Applied Computing 2006. 21st Annual ACM Symposium on Applied Computing, [online] http://portal.acm.org/citation.cfm?id=1141553&coll=portal&dl=ACM&CFID=2181828&CFTOKEN=68827537> [retrieved on Dec. 7, 2007], Apr. 23, 2006-Apr. 27, 2006, pp. 1166-1171.

IBM, "Mean to Protect System From Virus" , Aug. 1, 1994, IBM Technical Disclosure Bulletin, IBM Corp., New York, US, XP000456561 ISSN: 0018-8689; pp. 659-660.

Igakura, Tomohiro et al., Specific quality measurement and control of the service-oriented networking application., Technical Report of IEICE, IEICE Association, Jan. 18, 2002, vol. 101, Issue 563, pp. 51-56, Japan.

International Search Report, International Application No. PCT/US2006/049149, Mailed Mar. 10, 2008, 4 pages.

IronPort Web Reputation: Protect and Defend Against URL-Based Threats; Ironport Systems, Apr. 2006, 8 pages.

(56) References Cited

OTHER PUBLICATIONS

Iron Port Web Reputation White Paper, A Comprehensive, Proactive Approach to Web-Based Threats, Ironport Systems 2009, pp. 10.

Jiang et al., Towards Junking the PBC: Deploying IP Telephony, NOSSDAV'01 Proceedings of the 11th International Workshop on Network and Operating Systems Support for Digital Audio and Video, Jun. 25-26, 2001, pp. 177-185, New York.

Ong et al., Unicorn: Voluntary Computing over Internet, ACM SIGOPS Operating Systems Review, vol. 36, Issue 2, Apr. 2002, pp. 36-51.

PCT Search Report for PCT/US2006/018823, Sep. 25, 2006.

Resnick, P. et al., "PICS: Internet Access Controls Without Censorship", Communications of the Association for Computing Machinery, ACM, Oct. 1, 1996, vol. 39, Issue 10, pp. 87-93, New York, NY.

Schmid, et al., "Protecting Data from Malicious Software", IEEE; Proceedings of the 18th Annual computer Security applications conference; 10 pages.

Symantec Corporation: "E-security begins with sound security policies", Announcement Symantec, XP002265695, Jun. 14, 2001, pp. 1,9.

Williams, R., Data Integrity with Veracity, Retrieved from the Internet: <URL:ftp://ftp.rocksoft.com/clients/rocksoft/papers/vercty10.ps>, Sep. 12, 1994.

Williams R. N.: "Data Integrity With Veracity" Internet Citation, [Online], Sep. 12, 1994, XP002096828 Retrieved from the Internet: URL:ftp://ftp.rocksoft.com/clients/rocksoft/papers/vercty10.ps> [retrieved on Mar. 16, 1999], 13 pages.

Basney et al., Improving Goodput by Coscheduling CPU and Network Capacity, The International Journal of High Performance Computing Applications, Fall 1999, vol. 13, Issue 3, pp. 220-230.

Rose et al., Current Technological Impediments to Business-to-Consumer Electronic Commerce, Communications of AIS, Jun. 1999, vol. 1, Issue 5, pp. 1-76, Article 16.

\* cited by examiner

REAL TIME LOCKDOWN

CROSS REFERENCE TO RELATED APPLICATIONS

This application is a continuation of U.S. patent application Ser. No. 11/319,678, filed Dec. 28, 2005, and entitled "REAL TIME LOCKDOWN," and assigned to the assignee of the present application. The disclosure of this prior application is incorporated herein by reference in its entirety.

BACKGROUND OF THE INVENTION

1. Field of the Invention

The invention relates to security in computers and more particularly to a method for protecting executable software programs against infection by computer software virus programs.

2. Description of the Related Art

Computer software virus programs on personal computers and/or servers (especially those received through the Internet) are becoming more and more common and increasingly more dangerous. Virus programs are adapted to corrupt other executable computer software programs, such as by replicating themselves over an existing program or by adding code to the beginning or end of the program. Since their appearance, the number, performance, and intelligence of virus programs have greatly increased. The persons who write computer viruses continue to find means for making their viruses increasingly transparent and difficult to detect by a computer user.

However, the methods used by various virus programs for infecting computer programs are substantially similar. Most computer viruses replicate themselves by infecting executable programs. Executable programs typically comprise a series of instructions that are executed by a central processing unit (CPU) of a computer containing the program, when the program is invoked. The objective of computer viruses is to obtain control of a desired executable program before normal processing of the program begins. Therefore, the virus program must have its instructions executed by the CPU, before the CPU begins processing the instructions of the executable program.

Since the virus often writes its code into the program at several different locations, restoring the program is a time consuming process. Further, as the virus code is in the program at different locations, it is substantially difficult to be absolutely sure that the virus code is completely removed from the program when the program is restored, without damaging the program itself.

There are systems in the prior art for protecting executable programs from infections by virus programs. One such system performs a lockdown of the computer by inventorying all the files on the machine. In such a system, an information technology professional initiates lockdown in response to an identified network or computer threat. The lockdown process creates a list of executable program files which are deemed as trusted. A signature is then created for the trusted executable program files. The trusted signature for an executable program file is compared to a newly created signature for that same program each time the program is executed. If the newly created signature does not match the trusted signature, the information technology professional is notified. Operation of the prior art lockdown system is time consuming when collecting the trusted file information and creating signatures for the trusted files. The inefficiency in performing a lockdown is further exacerbated when the lockdown computer is a larger or shared server or computer.

It is desirable to not only efficiently monitor and protect computers from malicious executable program files but to also efficiently monitor the executable program file's behavior. These behaviors may include executions, registry access, and network access.

SUMMARY OF THE INVENTION

The systems and methods of the invention have several features, no single one of which is solely responsible for its desirable attributes. Without limiting the scope of the invention as expressed by the claims which follow, its more prominent features will now be discussed briefly. After considering this discussion, and particularly after reading the section entitled "Detailed Description of the Invention" one will understand how the features of the system and methods provide several advantages over traditional virus protection systems.

One aspect is a method of preventing the execution of file data on a workstation. The method comprises identifying a file having modified file data, flagging meta data associated with the modified file data, and preventing the modified file data from executing based at least in part on the flagged meta data associated with the modified file data.

Another aspect is a method of creating a signature and flag for an executable software program on a workstation. The method comprises creating a new file on a workstation, identifying the new file with a flag, wherein the flag is a code added to meta data associated with the new file, creating a hash for the new file, wherein the hash is created at least in part on the meta data associated with the new file, and storing the hash and the flag in a memory.

Still another aspect is a method of monitoring and tracking changes to a signature for a modified file. The method comprises modifying an executable file, creating a signature for the modified file, wherein the signature is based at least in part on meta data associated with the modified file, and determining if the signature is already stored. The method further comprises that if the signature is already stored, then determining if the signature is associated with a flag, if the signature is not stored, then adding a flag to meta data associated with the modified file, if the signature associated with the modified file is not stored, then associating a flag with the modified file, and storing the flag and the signature associated with the modified file.

Another aspect is a method of protecting a workstation from a virus threat. The method comprises modifying meta data associated with a first file, wherein the first file is a trusted file, identifying a virus threat, and initiating a lock down mode in response to the identified virus threat, wherein files created or modified after the lock down is initiated are not allowed to execute. The method further comprises flagging a second file created after initiation of the lock down mode, wherein the second file relates to the first file, denying execution of the second file, and terminating the lock down mode after denying execution of the second file.

Yet another aspect is a system for preventing the execution of software code. The system comprises a software module configured to modify a data file having meta data associated with the data file, a storage medium configured to store the data file, and a filter configured to flag the meta data associated with the modified file data during a lock down mode and prevent the modified file data from executing based at least in part on the flagged meta data associated with the modified file data.

Still another aspect is a system for preventing the execution of file data on a workstation. The system comprises means for modifying file data having meta data associated with the file data, means for flagging the meta data associated with the modified file data, and means for preventing the modified file data from executing based at least in part on the flagged meta data associated with the modified file data.

Another aspect is a program storage device storing instructions that when executed by a computer perform the method of identifying a file having modified file data, flagging meta data associated with the modified file data, and preventing the modified file data from executing based at least in part on the flagged meta data associated with the modified file data.

Still another aspect is a program storage device storing instructions that when executed by a computer perform the method of creating a new file on a workstation, identifying the new file with a flag, wherein the flag is a code added to meta data associated with the new file, creating a hash for the new file, wherein the hash is created at least in part on the meta data associated with the new file, and storing the hash and the flag in a memory.

Yet another aspect is a program storage device storing instructions that when executed by a computer perform the method of modifying a executable file, creating a signature for the modified file, wherein the signature is based at least in part on meta data associated with the modified file, and determining if the signature is already stored. The method further comprises that if the signature is in the signature table, then determining if the signature is associated with a flag, if the signature is not in the signature table, then adding a flag to meta data associated with the modified file, if the signature associated with the modified file is not stored, then associating a flag with the modified file, and storing the flag and the signature associated with the modified file.

Yet still another aspect is a program storage device storing instructions that when executed by a computer perform the method of modifying meta data associated with a first file, wherein the first file is a trusted file, identifying a virus threat, and initiating a lock down mode in response to the identified virus threat, wherein files created or modified after the lock down is initiated are not allowed to execute. The method further comprises flagging a second file created after initiation of the lock down mode, wherein the second file relates to the first file, denying execution of the second file, and terminating the lock down mode after denying execution of the second file.

DETAILED DESCRIPTION OF CERTAIN EMBODIMENTS

The following detailed description is directed to certain specific embodiments of the invention. However, the invention can be embodied in a multitude of different systems and methods. In this description, reference is made to the drawings wherein like parts are designated with like numerals throughout.

In connection with the following description, many of the components of the various systems which may be included in the entire system, some of which are referred to as modules, can be implemented as software, firmware or a hardware component, such as a field programmable gate array (FPGA) or application specific integrated circuit (ASIC), which performs certain tasks. Such components or modules may be advantageously configured to reside on the addressable storage medium and configured to execute on one or more processors. Thus, a module may include, by way of example, components such as software components, object oriented software components, class components and task components, processes, functions, attributes, procedures, subroutines, segments of program code, drivers, firmware, microcode, circuitry, data, databases, data structures, tables, arrays and variables. The functionality provided for in the components and modules may be combined into fewer components and modules or further separated into additional components and modules. Additionally, the components and modules may advantageously be implemented to execute on one or more workstations.

A system and method is described that monitors executable files existent on a workstation prior to the executable performing various functions, including executing, accessing a network, and accessing a registry. The system detects new executable files added to the workstation as well as previously existing executable files that have been modified, moved, renamed or deleted. In certain embodiments, the system flags the executable file as modified or newly added. Once flagged, the system intercepts particular types of file functions and determines if the file performing the function is flagged. If flagged, the system and methods applies one or more policies based on the requested function and the security status of the system. In certain embodiments, the system intercepts I/O operations by file systems or file system volumes and flags metadata associated with the file. For example, the NT File System and its extended attributes and alternate streams may be utilized to implement the system.

Figure 1:
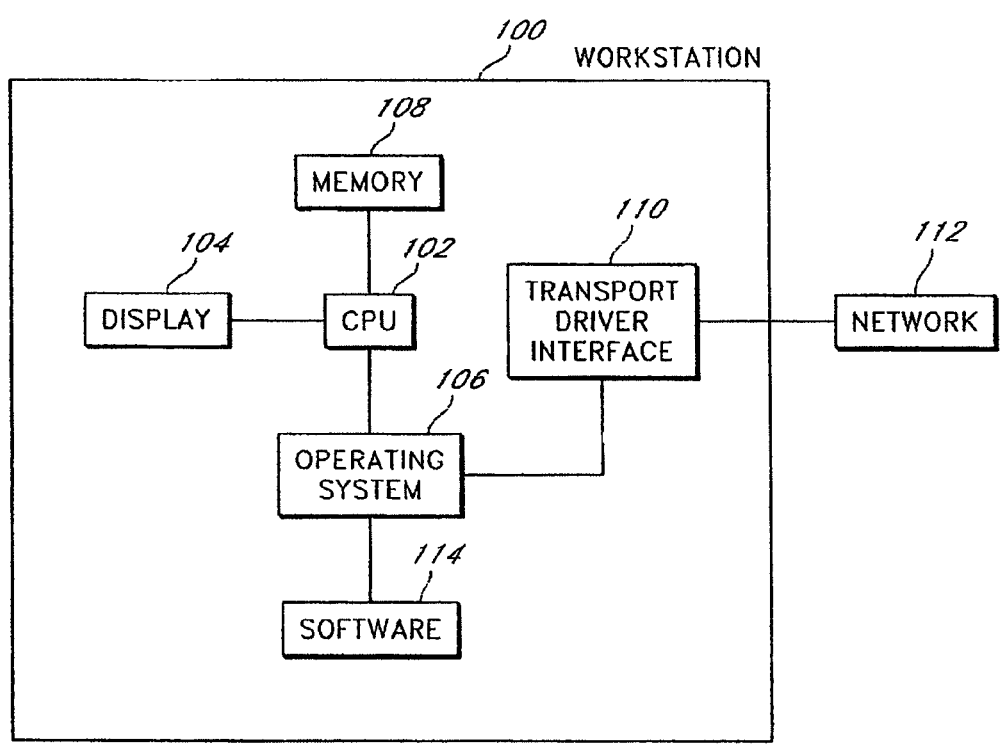
FIG. 1 is a drawing illustrating an embodiment of a workstation in communication with a network and configured to perform a real time lockdown according to an embodiment of the invention.

FIG. 1 shows an embodiment of a workstation 100 in communication with a network 112 and configured to perform a real time lockdown according to an embodiment of the invention. The workstation 100 can be a personal computer operating, for example, under the Microsoft Windows operating system, however, other computers, such as those manufactured by Apple can be used. For ease of explanation, only a single network 112 is shown, though two or numerous such networks could be included. Similarly, two or more workstation 100 could also be employed.

Shown is a schematic representation of the workstation 100 for implementation of the method described herein. The workstation 100 typically comprises a central processing unit (CPU) 102 for processing data, an input means such as a keyboard for data processing, and an output means such as a display or video monitor 104 so that a user can view data being processed by the CPU 102. The workstation 100 is further provided with a known storage medium or memory 108 for storing data using, for example magnetic, optical or the like technology. In certain embodiments, the memory 108 is a hard disk drive. In certain embodiments, the file, application program, or software 114 resides on the hard disk in the memory 108. In certain other embodiments, the file, application program, or software 114 is stored separate from the memory 108.

For data processing, the user typically calls an executable computer program or file stored on a hard disk in the memory 108, such as a well known random access memory (RAM). In certain embodiments, the memory may include a Dynamic Random Access Memory (DRAM), Static Random Access Memory (SRAM), Erasable Programmable Read Only Memory (EPROM) or Electrically Erasable Programmable Read Only Memory (EEPROM).

The user then utilizes the program to process data. After processing, the program is closed and stored in the memory 108. Any data that is processed using the program may also be stored in the memory 108, or the data may be stored on, for example, a USB key (not shown).

The user may interface with an operating system 106 when calling the executable computer program or file 114. The operating system 106 provides a software platform on top of which the software, file, or application program 114 can run. The operating system 106 permits one or more file system filters to be inserted between an I/O manager that receives user I/O requests and the file system driver.

For example, a file 114 is written to run on top of a particular operating system 106. For personal computers, the most popular operating systems 106 are DOS, OS/2, and Windows. Many times for simplicity of understanding we use terms that are most commonly used within Microsoft Windows environment (which is the most common operating system for personal computers), so it should be kept in mind that in other operating systems such as for example Linux or Macintosh some of these might have different names, somewhat different implementations, etc., although the principles are similar.

In certain embodiments, the user interacts with the operating system 106 through a set of commands. For example, the DOS operating system contains commands such as COPY and RENAME for copying files and changing the names of files, respectively. The commands are accepted and executed by a part of the operating system 106 called the command processor or command line interpreter.

For NTFS, the core operating system 106 code runs in a privileged processor mode. This mode is also known as protected mode (when referring to the CPU), or kernel mode (when referring to a process or thread). Protected mode provides direct access to system memory and other hardware.

Executable files run in a nonprivileged processor mode known as user mode and have no direct hardware access. Executable files use the Application Programming Interface (API) in the operating system 106 to perform tasks such as reading or writing to memory 108 or to the screen.

The display 104 allows the user to enter commands by pointing and clicking at objects that appear on the display 104.

The objective of a virus program is to obtain control of the file 114 or executable program, before normal processing of the file begins. Infection of the file 114 may occur when the virus program adds its executable instructions or code to the file. The virus then causes the file 114 to be invoked with the virus instructions, instead of the files native instructions, corrupting and possibly destroying the file. Therefore, the virus program tries to have its instructions executed by the CPU 102, before the CPU 102 begins processing the file's code. For the virus to be executed before the file, the virus may either modify the file's first instruction or entry point of the file, so that the code of the virus will be processed prior to the file being processed.

The virus program may attempt to infect the file 114 by attaching its code to an end of the file. The virus may also modify an entry point indicator of the file by overwriting the beginning of the file, and thus the entry point indicator, with its own entry point indicator. Therefore, the virus code becomes the first instructions of the file.

Exemplary operating system files 114 include Windows registry and initialization files. The Windows registry is a database consisting of two files used to store settings and options for Windows and contains information and settings for all the hardware, software, users, and preferences of the workstation 100. The Windows registry has a hierarchical structure with main branches containing sub-branches, called "keys", which store "values" containing the actual information stored in the registry.

A transport driver interface 110 interfaces with the network 112 to allow communication between the network 112, which may be a LAN, and the workstation 100. The LAN can have an Ethernet 10-base T topology, or be based on any networking protocol, including wireless networks, token ring network and the like. The transport driver interface 110 provides software programmers with a protocol-independent network API for network services to exchange information and data with the other devices on the network 112. Programmers need only to program against the transport driver interface 110 to support all available network protocols.

For example, the workstation 100 may communicate with other networks, for example, a WAN (wide area network). In certain embodiments, the network 112 is a LAN in communication with a WAN. An exemplary WAN is the Internet. In embodiments having access to the Internet, the transport driver interface 110 communicates with the WAN via connection devices, such as routers or other data packet switching technology, for translating Internet TCP/IP protocols into the proper protocols for communicating with the Internet. The connection devices used to implement a given system can vary as well as its location within the network 112. For example, the connection devices could be located at the workstation(s) 100 or connected peripherally to the Internet. An exemplary connection device includes a firewall module (not shown) coupled to a router module (not shown).

The workstation may also be capable of communicating with other devices via a Public Switched Telephone Network (PSTN) using the transport driver interface 110. An internal bus may allow communication between each of the components connected thereto.

Figure 2:
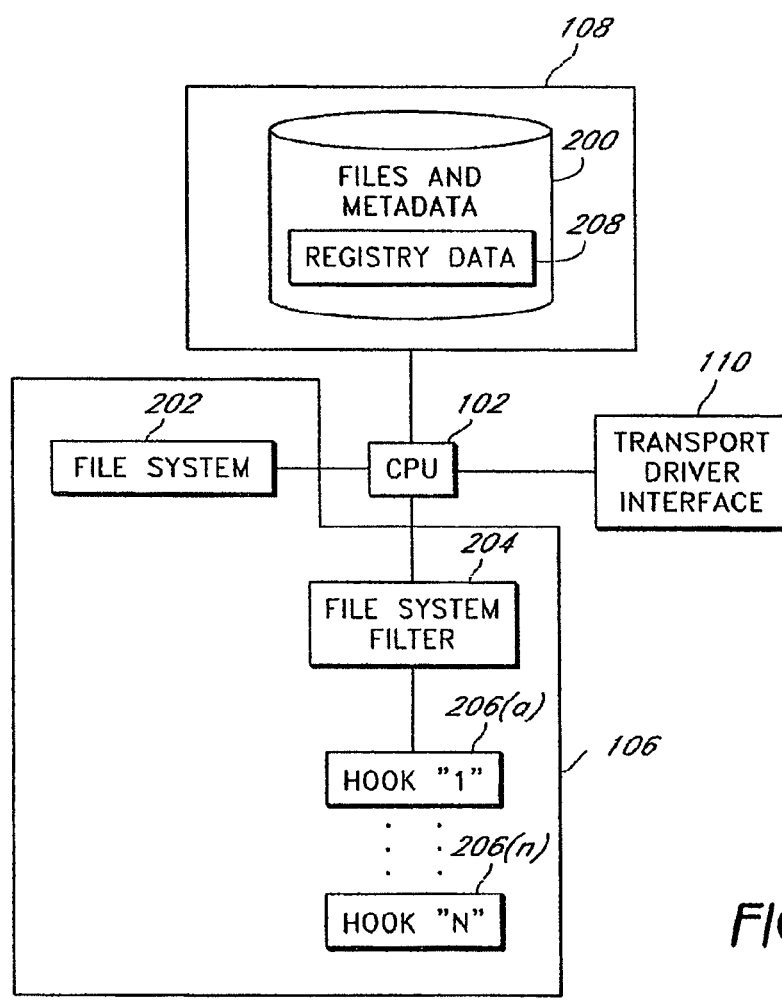
FIG. 2 is a drawing illustrating one embodiment of the software from FIG. 1.

FIG. 2 shows one embodiment of the software 114 from FIG. 1. In this embodiment, the software 114 comprises one or more file system filters 204 and one or more file systems 202. The file system 202 comprises one or more file systems or file system volumes. Each file in the file system comprises file data and meta data associated with the file data. The file data is employed by the user of the workstation 100. Exemplary meta data includes permissions. In NTFS, meta data includes extended attributes and alternate streams. Meta data can be added to a file system 202 if meta data is not native to the file system 202.

The file system 202 refers to how the operating system 106 stores and locates files. Exemplary file systems include Windows NT File system (NTFS), File Allocation Table (FAT), Compact Disk File System (CDFS), and Common Internet File System (CIFS). The files may be stored on the memory 108.

The file system filter 204 is configured to monitor the file system 202. In this manner, the file system filter 204 can, for example, scan file data for viruses, enforce disk usage quotas, encrypt data, and perform other similar functions. Exemplary file system filters include encryption filters and anti-virus filters. In certain embodiments, the file system filter 204 identifies new or modified executable programs from the file system 202. The file system filter 204 flags the meta data associated with modified or newly added files. The file system filter 204 also identifies flags in the meta data associated with a new or modified executable program.

In certain embodiments, the file system filter 204 is a kernel-mode driver configured to enhance the underlying file system 202. The file system filter 204 performs various file-related computing tasks requested by a user of the workstation 100. These tasks may include, for example, passing file system I/O (requests and data) through anti-virus software, file system quota providers, file replicators and encryption/compression products. Preferably, the file system filter 204 watches I/O to and from executable files (for example, exe suffix files) looking for flags. In certain embodiments, the file system 204 prevents new files and files that have been modified from executing. The file system filters 204 can be stacked or otherwise arranged linearly (e.g., chained), and perform their operations in the order in which they are stacked. For example, in the Windows 2000 operating system, file system filter drivers are stacked into a driver stack where they are able to intercept file system-directed requests and responses to and from the file system 202.

Hooks 206 are third party subroutines and are the same as native system application programming interfaces (API). System API hooks are installed by changing the system service descriptor table. Typically hooks are installed to monitor application software's interaction with the system. Exemplary hooks include CreateProcess and RegCreateKey. In the embodiment illustrated in FIG. 2, the hook 206 software program hooks into the operating system 106 APIs and filters access to execution or access to registry. For example, the hook 206 initiates the file system filter 204 to prevent the operating system 106 from executing a file corrupted by a virus.

In certain embodiments, the file system filter 204 identifies or flags new files and modified files. Preferably, these flags are added to the meta data associated with the user data file. In this way, the user data file is not modified by the file system filter 204. The file system filter 204 subsequently relies upon the flags in the meta data to monitor input and output (I/O) operations from the file system 202. For example, when an executable file is requested by the operating system 106, the file system filter 204 checks the meta data that is associated with the requested executable file for one or more flags. The file system filter 204 may allow, deny, or limit the requested executable file from executing at least partially based upon whether the meta data includes one or more flags. In certain embodiments, the file system filter 204 comprises a kernel which monitors file system 202 activity. The kernel is an essential part of the file system filter 204 that performs basic I/O functions.

The methods and systems may be embodied as computer executable code or software 114 stored in memory 108 or stored elsewhere and accessible by the workstation 100. The computer executable code may be stored and executed at a remote site that is in communication with workstation 100 for protecting software programs against infection by computer software virus programs. An intrusion detection system determines whether to allow the operating system 106 to execute one or more files from the file system 202. In certain embodiments, the intrusion detection system is the hook 206. The intrusion detection system further identifies or flags newly created and modified files. The intrusion detection system or hook 206 is configured to determine what access, if any, is allowed to the flagged files.

In certain embodiments, when an executable file is launched, the hook 206 detects the launch and directs the software 114 to analyze meta data related to the requested file. As part of its analysis, the software 114 can modify the existing meta data related to the requested file. Modification of the existing meta data may be performed when the requested file is new or modified. In certain embodiments, a modification to the meta data for a new file is different than a modification to the meta data for a modified file.

In one embodiment, the software 114 checks to see if the meta data matches any meta data signatures for trusted executable files. If a match between the requested file and meta data is found, the software 114 need not modify the meta data as the requested file has previously been identified as a trusted file.

If the software 114 does not find a matching meta data signature, the software 114 then determines how to proceed with the requested file. For example, running of the application could be allowed when a lock down is not in force. Alternatively, the software 114 can stop execution of the requested file when a lock down is in force.

In certain embodiments, the software 114 flags the meta data by adding a flag, hash or other code to the meta data. In certain embodiments, the hash is generated from properties of the requested file. Examples of such properties include the name, publisher, suite, hash, file size, version, and additional information or properties which are associated with the requested file.

Once the executable file that is being requested to run on the workstation 100 is identified, a policy which corresponds to the meta data for that file is also identified. The file system filter 204 identifies a policy to associate with the requested file based at least in part on the meta data to determine what access privilege should be applied to the request to run the file. These policies or rules can include, for example, allowing the execution of the program, denying execution of the program, alerting the user that the request to run the application will be logged, and allowing the user a specific amount of time in which to run the application. In certain embodiments, the policies are only implemented when a lock down is in force. For example, when a lock down is in force, the file system filter 204 disallows execution of new files and modified files.

Figure 3:
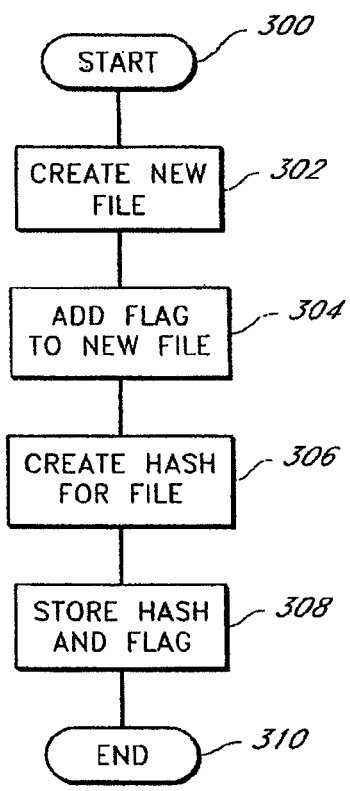
FIG. 3 is a flow diagram of exemplary steps performed by the system of FIG. 1 when creating a signature and flag for a new file or executable software program on the workstation.
Figure 4:
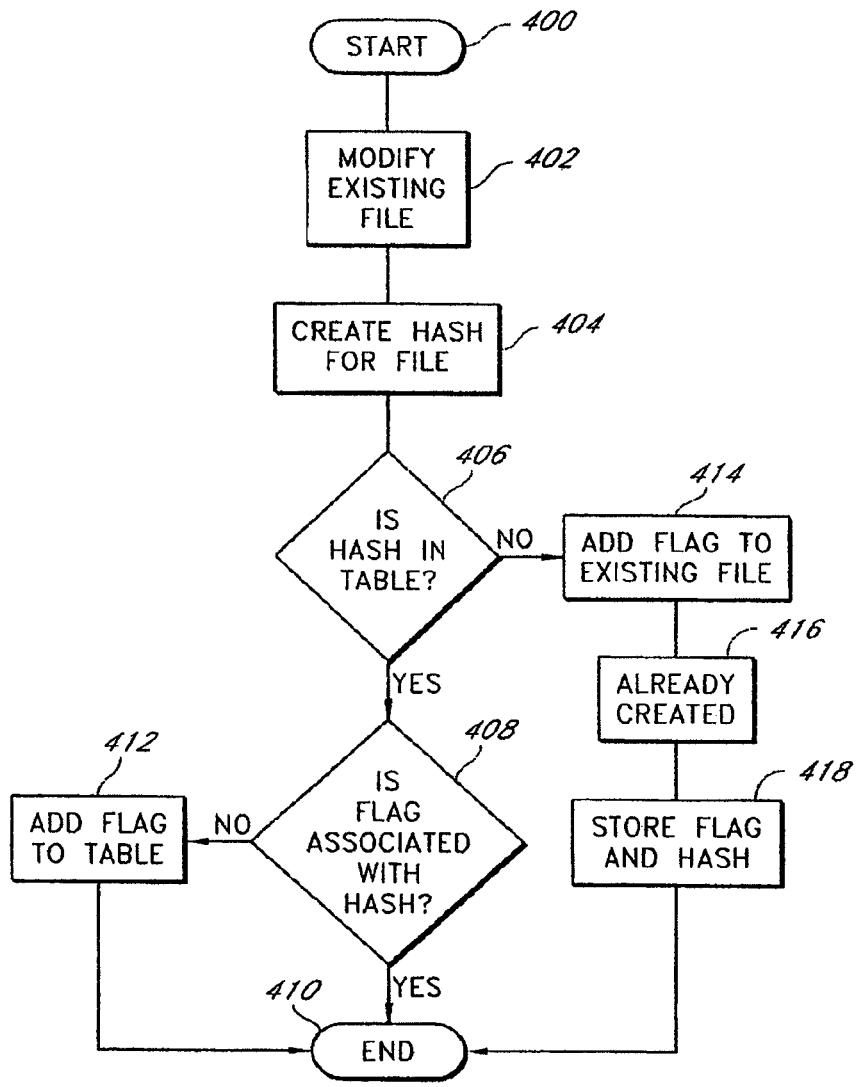
FIG. 4 is a flow diagram of exemplary steps performed by the system of FIG. 1 to monitor and track changes to the signature for a modified file on the workstation.

FIGS. 3 and 4 are flow diagrams of the steps performed by the file system filter 204 when new files are created or existing files are modified. In certain embodiments, the file system filter 202 filters all I/O requests going to the file system 202. In certain embodiments, the processes described with reference to FIGS. 3 and 4 are initiated by some user mode code from a user of the workstation 100.

FIG. 3 shows a flow diagram of exemplary steps performed by the system of FIG. 1 when creating a hash or signature and flag for a new file or executable software program on the workstation 100. The hash and flag are relied upon by the software 114 when a user requests the executable file associated with the hash and flag during a lock down. The new file comprises user data and meta data associated with the user data. The process begins at a state 300. Next at a state 302, a new file is created on the workstation 100. Continuing to state 304, the software 114 adds a flag to the new file. In certain embodiments, the flag is in the form of code added to meta data associated with the new file. The process moves to a state 306 where the software 114 creates a hash for the file. In certain embodiments, the hash is created from the meta data associated with the file. Next, the software 114 stores the hash and flag.

FIG. 4 shows a flow diagram of exemplary steps performed by the system of FIG. 1 to monitor and track changes to the hash or signature for a modified file on the workstation 100. Advantageously, the file I/O is monitored real time and not only in response to a lock down being initiated. In these advantageous embodiments, it is not necessary for the software 114 to collect all of the trusted files information at one point in time. Instead, the embodiment described with reference to FIG. 4 collects the file information on an ongoing basis. The process begins at a state 400. Next at a state 402, the software 114 modifies an existing executable file. Continuing to a state 404, the software 114 creates a signature or hash for the modified file. The hash may be based at least partially upon the meta data associated with the modified file. Next at a decision state 406, the software 114 determines if the hash is already in the hash table. If the hash is already in the hash table, the process moves to a decision state 408 where the software 114 determines whether the hash is associated with a flag. For example, the flag may already identify the modified file as being restricted when a lock down is in force. If a flag is already associated with the requested file, the process ends at a state 410.

Returning to decision state 408, if a flag is not associated with the hash for the modified file, a flag is added to the meta data associated with the requested file at state 412. The process then continues to end state 410.

Returning to decision state 406, if the hash identifying the modified file is not in the hash table, the process moves to a sate 414 where a flag is added to the modified file. Next, at a state 416, the flag and hash associated with the modified file are stored in a hash/flag table. The process then moves to end state 410.

Figure 5:
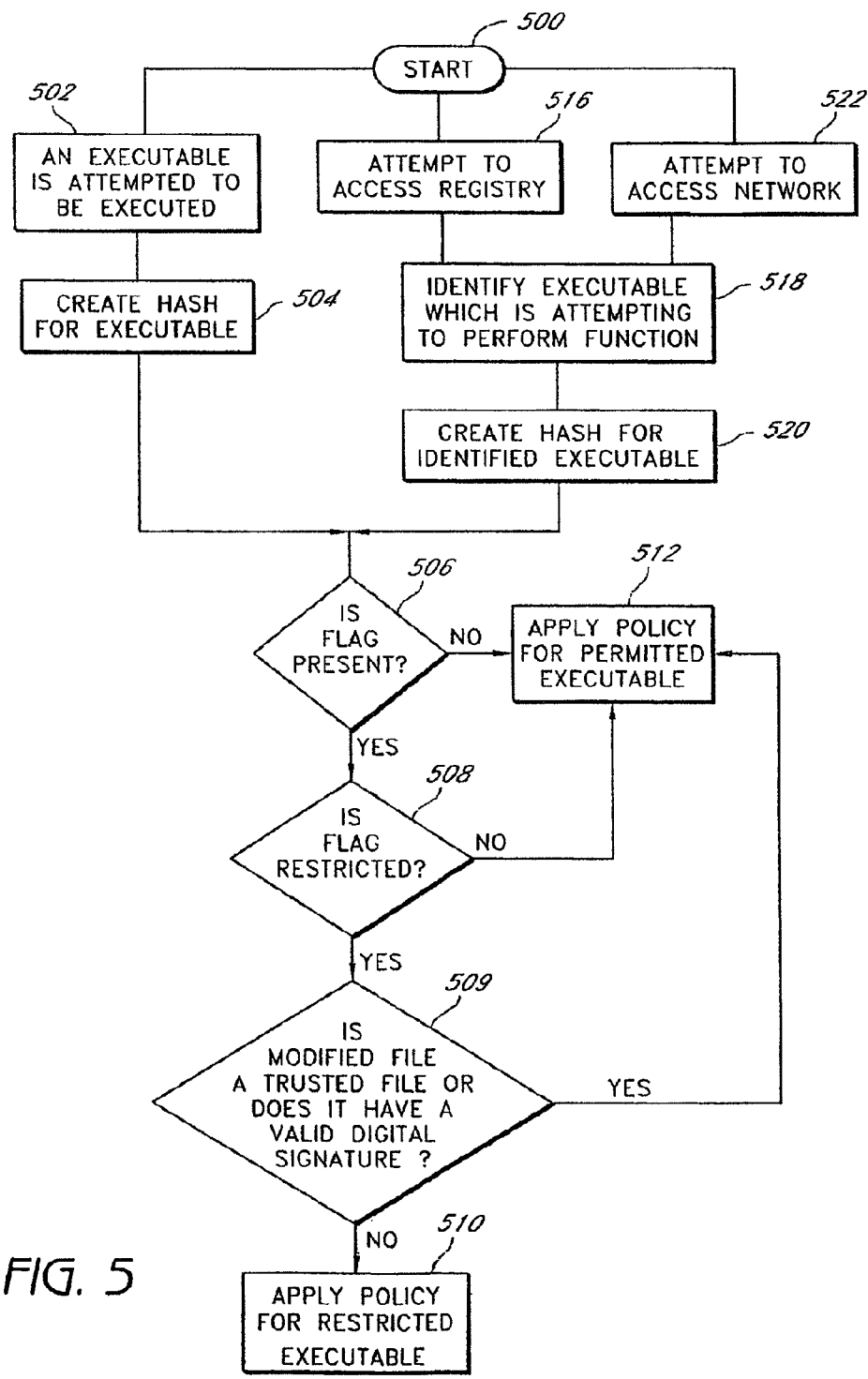
FIG. 5 is a flow diagram of exemplary steps performed by the system of FIG. 1 to protect the workstation from a file operating in an unexpected manner.

FIG. 5 shows a flow diagram of exemplary steps performed by the system of FIG. 1 to protect the workstation 100 from a file operating in an unexpected manner. The process starts at a state 500. If a file attempts to execute, the process moves to a state 502. Next, at a state 504, the software 114 creates a hash for the requested file. Next at a decision state 506, the software 114 determines if a flag is associated with the requested file. If a flag is not associated with the hash associated with the requested file, the process moves to a state 512 where the software 114 applies a policy for a trusted or unrestricted files. The policy may allow the requested file to execute on the workstation 100.

Returning to decision state 506, if a flag is associated with the requested file, the process moves to a decision state 508 where the software 114 determines whether the flag is restricted. If the flag is not restricted, the process proceeds to state 512 as described above.

Returning to decision state 508, if the flag associated with the requested file is restricted, the software 114 determines whether the modified file is a trusted file. A trusted file may have a valid digital signature. If the file is a trusted file or has a valid digital signature, the process proceeds to state 512 as described above.

Returning to decision state 509, if the modified file is not a trusted file and does not have a valid digital signature, the software 114 applies the policy for a restricted file. The policy may disallow the requested file to execute on the workstation 100.

Returning to start state 500, if an attempt is made to access the registry, the process moves to a state 516. Next, at a state 518, the software 114 determines which executable file attempted to access the registry. Next at a state 520, the software 114 creates a hash for the identified file. The process then continues to decision state 506 as described above.

Returning to start state 500, if an attempt is made to access the network, the process moves to a state 522. Next, at a state 518, the software 114 determines which executable file attempted to access the network. Next at a state 520, the software 114 creates a hash for the identified file. The process then continues to decision state 506 as described above.

Figure 6:
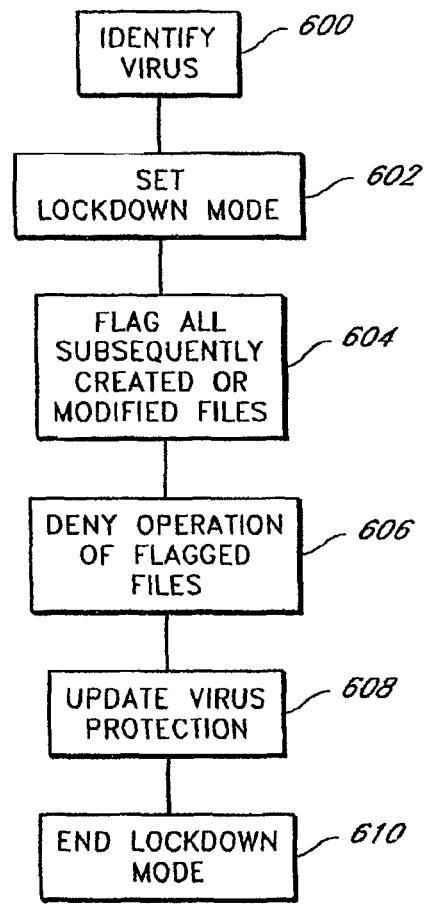
FIG. 6 is a flow diagram of exemplary steps performed by the system of FIG. 1 to lock down and protect one or more workstations.

FIG. 6 shows a flow diagram of exemplary steps performed by the system of FIG. 1 to lock down and protect one or more workstations. In certain embodiments, lock down is initiated in response to a virus threat. In certain other embodiments, the one or more workstations are in lock down mode when there is no virus threat. In embodiments where the workstation is continually in lock down mode, the system may allow certain trusted files to be modified during lock down. It may be safe allowing the trusted file to modify an existing file even when the trusted file is unknown to the system. For example, a Microsoft Windows Update file having a valid digital signature may be allowed by the system to modify the Windows operating system during lock down mode. The system may allow an anti-virus update file having a valid digital signature to modify an existing anti-virus file during lock down mode.

The process begins at a start state 600. Next at a state 602, lock down mode is in force. The lock down mode may be initiated due to a virus threat. In certain embodiments, the workstation is continually in lock down mode. In certain embodiments, the workstation is continually in lock down mode even when there is no virus threat. In embodiments where lock down is initiated due to a virus threat, the source of the virus threat may be within the local network or external to the local network.

The process continues to a state 604 where the software 114 flags all files as they are created or modified after lock down mode is initiated. Files are flagged in addition to the files previously flagged before lock down mode was initiated. In this way, the software 114 is able to operate almost seamlessly since the software 114 has already created hashes/signatures and flags for the files that were created or modified before lock down mode was initiated. By using the file system meta data to tag the file creation and changes, the system does not calculate signatures/hashes for the files when lock down is initiated. Hence enforcement of lockdown is more efficient. Advantageously, employing lock down is quick in response to a new virus threat.

The process moves to a state 606 where the software 114 denies operation of the flagged files. The process then moves to a state 610 where the lock down mode is terminated. Termination of lock down mode may occur in response to updating and enabling a file system filter 204, for example an anti-virus filter, to identify the computer software virus program. In certain embodiments, the workstation is continually in lock down mode.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

What is claimed is:

1. A method of managing access to a computer file stored by a computer file system, the computer file comprising file data and file meta data, the method comprising:
   generating, via an electronic processor, a hash based at least in part on the file meta data;
   writing the hash to the file meta data;
   writing a first indicator to the file meta data in response to detecting an attempt to modify the computer file; and
   applying, via an electronic processor, an access policy to the computer file based at least partially on the hash in the file meta data.

2. The method of claim 1, wherein the hash is not based on the file data.

3. The method of claim 1, wherein the computer file system is a Windows NT file system (NTFS), and the file meta data comprises extended attributes and alternate streams.

4. The method of claim 1, further comprising writing a second indicator to the file meta data in response to an attempt to create the computer file.

5. An apparatus for managing access to a computer file stored by a computer file system, the computer file comprising file data and file meta data, the apparatus comprising:
   An electronic processor;
   a memory, operably connected to the electronic processor, the memory configured to store instructions that configure the processor to:
   generate a hash based at least in part on the file meta data,
   write the hash to the file meta data,
   write a first indicator to the file meta data in response to detecting an attempt to modify the computer file, and
   apply an access policy to the computer file based at least partially on the hash in the file meta data.

6. The apparatus of claim 5, wherein the memory further stores instructions that configure the electronic processor to write a second indicator to the file meta data in response to a creation of the computer file.

7. The apparatus of claim 5, wherein the hash is not based on the file data.

8. The method of claim 5, wherein the computer file system is a Windows NT file system (NTFS), and the file meta data comprises extended attributes and alternate streams.

9. An apparatus for managing access to a computer file stored by a computer file system, the computer file comprising file data and file meta data, the apparatus comprising:
   an electronic processor;
   a memory, operably connected to the electronic processor;
   means for generating a hash based at least in part on the file meta data;
   means for writing the hash to the file meta data;
   means for writing a first indicator to the file meta data in response to an attempt to modify the computer file; and
   means for applying an access policy to the computer file based at least partially on the hash in the file meta data.

10. The apparatus of claim 9, further comprising means for writing a second indicator to the file meta data in response to a creation of the computer file.

11. The apparatus of claim 9, wherein the means for writing a first indicator to the file meta data is a file system filter driver executing on the electronic processor.

12. The apparatus of claim 9, wherein the means for storing the file meta data in the memory is a file system filter driver executing on the electronic processor.

13. The apparatus of claim 9, wherein the means for applying an access policy to the file based at least partially on the first indicator is a file system filter driver executing on the electronic processor.

14. A non-transitory computer-readable storage medium comprising instructions that when executed cause an electronic processor to perform a method of managing access to a computer file stored by a computer file system, the computer file comprising file data and file meta data, the method comprising:
   generating a hash based at least in part on the file meta data;
   writing the hash to the file meta data;
   writing a first indicator to the file meta data in response to detecting an attempt to modify the computer file; and
   applying an access policy to the computer file based at least partially on the hash in the file meta data.

15. The computer-readable storage medium of claim 14, wherein the hash is not based on the file data.

16. The computer-readable storage medium of claim 14, the method further comprising writing a second indicator to the file meta data in response to detecting an attempt to create the computer file.

* * * * *